United States Patent Office 3,629,461
Patented Dec. 21, 1971

3,629,461
SPASMOLYTIC COMPOSITIONS AND THE USE THEREOF WITH N - (ALKANOYLPHENOXYALKYL)-N,N,N-TRIALKY AMMONIUM SALTS
Pierre H. Payot, Basel, Switzerland, assignor to Ciba-Geigy Corporation, Ardsley, N.Y.
No Drawing. Filed Nov. 15, 1968, Ser. No. 776,245
Claims priority, application Switzerland, Nov. 29, 1967, 16,787/67
Int. Cl. A61k 27/00
U.S. Cl. 424—329
11 Claims

ABSTRACT OF THE DISCLOSURE

N-(alkanoylphenoxyalkyl)-N,N,N-trialkyl ammonium salts are the active ingredients of pharmaceutical compositions; these compounds and compositions are useful for the treatment of cramps; an illustrative embodiment is N - [2 - (2 - acetylphenoxy) - ethyl] - N, N- dimethyl-N-dodecyl ammonium bromide.

DETAILED DESCRIPTION

The present invention concerns pharmaceutical compositions and the use thereof.

N-(alkanoylphenoxyalkyl)-N,N,N-trialkyl ammonium salts of the formula

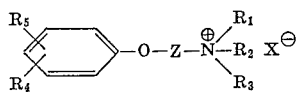

wherein $R_1$ is alkyl having from 10 to 18 carbon atoms,
each of $R_2$ and $R_3$ is alkyl each having at most two carbon atoms,
$R_4$ is lower alkanoyl,
$R_5$ is hydrogen, lower alkyl, lower alkoxy or a halogen atom up to the atomic number 35,
Z is alkylene having from 2 to 5 carbon atoms and 2 to 3 chain members between oxygen and nitrogen, and
$X^\ominus$ is a monovalent anion of a pharmaceutcially acceptable acid, have been found to have strong musculotropic-spasmolytic activity. These compounds are suitable as active ingredients for spasmolytic compositions which are useful, in particular, for the treatment of states of cramp of the stomach and intestinal tract, the biliary tract and the urogenital system of warm blooded animals.

Particularly good musculotropic-spasmolytic activity have compounds of Formula I wherein $R_1$ is dodecyl; $R_2$ and $R_3$ each are methyl; $R_4$ is lower alkanoyl in o-position; $R_5$ is hydrogen or methyl; Z is ethylene; and $X^\ominus$ is the monovalent anion of a pharmaceutically acceptable acid.

In compounds of Formula I $R_1$ is for example decyl, undecyl, dodecyl, tridecyl, tetradecyl, pentadecyl, hexadecyl, heptadecyl or octadecyl, $R_2$ and $R_3$ are methyl or ethyl and $R_4$, as lower alkanoyl, defined as having 1 through 4 carbon atoms, is e.g., formyl, acetyl, propionyl, butyryl or isobutyryl. $R_5$ as lower alkyl or lower alkoxy, defined as having 1 through 4 carbon atoms, can be, e.g., methyl, ethyl, isopropyl, n-butyl or tert. butyl, or methoxy, ethoxy, n-propoxy, isopropoxy, n-butoxy or isobutoxy. $R_5$ as halogen up to the atomic number 35 is fluoro, chloro, or bromo. Z is, e.g., ethylene, propylene, trimethylene, 1- or 3- methyl-trimethylene, 2-methyl-trimethylene, 1,3-dimethyl-trimethylene or 2,2-dimethyl-trimethylene. $X^\ominus$ as a monovalent anion of a pharmaceutically acceptable acid is the anion of, for example, hydrochloric acid, hydrobromic acid, sulfuric acid, phosphoric acid, methane sulfonic acid, ethane disulfonic acid, 2-hydroxyethane sulfonic acid, acetic acid, succinic acid, fumaric acid, maleic acid, malic acid, tartaric acid, citric acid, benzoic acid, salicyclic acid, phenylacetic acid, mandelic acid and embonic acid.

The new active substances of Formula I can be produced by various methods which are known per se. Three of these processes consist in the quaternisation of a suitable tertiary base with a reactive ester of a suitable hydroxy compound, particularly with a halide. Thus, a tertiary amine of Formula II

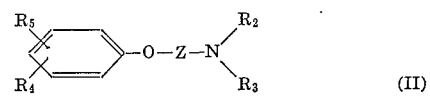

is reacted with an alkyl halide of Formula III

a tertiary amine of Formula IV

is reacted with an alkanoylphenoxyalkyl halide corresponding to Formula V

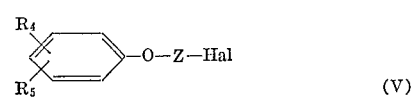

or, finally, a tertiary amine of Formula VI

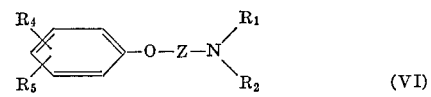

is reacted with a lower alkyl halide of Formula VII

In the above Formulae II, V and VII, Hal represents chlorine, bromine or iodine while $R_1$, $R_2$, $R_3$, $R_4$ and $R_5$ in all formulae in which they occur have the meanings given in Formula I. Also, dimethyl sulfate or diethyl sulfate can be used instead of a lower alkyl halide of Formula VII and, instead of the halides, corresponding p-toluene sulfonic acid esters can be used. The quaternisation is advantageously performed in the presence of a solvent or diluent which is inert to the reaction components such as an aromatic hydrocarbon, e.g. benzene, toluene or xylenes, a chlorinated aromatic hydrocarbon, e.g. benzene, toluene or xylenes, a chlorinated aromatic hydrocarbon, e.g. chlorobenzene, an N-alkylated acid amide such as dimethyl formamide, a nitrile, an ether or such like. The reaction temperatures lie between 50 and 150°. The duration of the reaction is about 15 minutes to 24 hours and it depends substantially on the reactivity of the reaction components and the solvent used. If desired, the salts, halides, or methyl sulfates, ethyl sulfates or salts of p-toluene sulfonic acid immediately obtained are converted into salts with other pharmaceutically acceptable inorganic and organic acids. This can be done, e.g. by liberation of the quaternary ammonium base, e.g. with silver hydroxide, and subsequent neutralisation with the acid desired as new salt component, or by treatment of the original salt with a synthetic anion exchange resin.

The production of quaternary ammonium salts of Formula I is further illustrated below under A to E. The temperatures are given in degrees centigrade.

(A) A solution of 2.43 parts of 2'-(2-bromoethoxy)-acetophenone in 7.0 parts of a 33% by volume ethanolic dimethylamine solution is heated in an autoclave for 6 hours at 80°. The reaction mixture is concentrated and the residue is dissolved in excess 2 N hydrochloric acid. Non-basic side products are taken up in ether. The acid layer is rendered alkaline with 2 N sodium hydroxide solution and extracted with ether. The ethereal solution is washed with water, dried over sodium sulphate, filtered and concentrated. The remaining oil is heated for 4 hours on a boiling water bath with 1.8 parts of dodecyl bromide. After cooling, the oily mass obtained is thoroughly washed with ethyl acetate. The precipitated crystals are filtered off and recrystallised from acetone/ethyl acetate to give N-[2-(2-acetyl-phenoxy)-ethyl] - N,N - dimethyl-N-dodecyl ammonium bromide, M.P. 86–89°.

(B) N-[2-(4-formylphenoxy)-ethyl] - N,N - dimethyl-N-dodecyl ammonium bromide, M.P. 75–78°, is obtained in the manner described under A using equivalent amounts of 4-(2-bromoethoxy)benzaldehyde and ethanolic dimethylamine solution.

(C) A mixture of 2.43 parts of 2'-(2-bromoethoxy)-acetophenone, 1.99 parts of N-methyl-N-n-dodecylamine and 4 parts by volume of 96% ethyl alcohol is heated in a bomb tube for 16 hours at 160°. The solvent is distilled off in vacuo, the residue is dissolved in excess 2 N hydrochloric acid and non-basic parts are removed by extracting twice with ether. The aqueous solution is rendered alkaline to mimosa paper with 2 N sodium hydroxide solution. The base is extracted with ether, dried with magnesium sulphate and the ether is distilled off in vacuo. The oily residue is reacted with 3 parts by volume of methyl bromide. An oily substance precipitates which is purified on a silica gel column to give N-[2-(acetylphenoxy)-ethyl]-N,N-dimethyl-N-dodecyl ammonium bromide, M.P. 87–88°.

(D) N-[2-(4-formylphenoxy)-ethyl] - N,N - dimethyl-N-octadecyl ammonium bromide is obtained as an oil in the manner described under C using equivalent amounts of 4-(2-bromoethoxy)benzaldehyde, N-methyl-N-octadecylamine and methyl bromide.

(E) A mixture of 2.43 parts of 2'-(2-bromoethoxy)-acetophenone and 2–13 parts of dodecyl-dimethylamine is heated for 20 hours on a boiling water bath. After cooling the oily mass is thoroughly washed with ethyl ether. The precipitated crystals are filtered off, washed with ethyl acetate, dried and recrystallised twice from acetone/ether, to give N-[2-(2-acetyl-phenoxy)-ethyl]-N,N-dimethyl-N-dodecyl ammonium bromide, M.P. 91–92°

The following quaternary ammonium salts are obtained analogously to the above methods:

| Compounds | Melting point, degrees |
| --- | --- |
| N-[2-(2-formylphenoxy)-ethyl]-N,N-dimethyl-N-dodecyl ammonium bromide | 104–110 |
| N-[2-(2-formyl-4-chlorophenoxy)-ethyl]-N,N-dimethyl-N-dodecyl ammonium bromide | 123–124 |
| N-[2-(2-formyl-4-bromophenoxy)-ethyl]-N,N-dimethyl-N-dodecyl ammonium bromide | 119–120 |
| N-[2-(2-formyl-4-methylphenoxy)-ethyl]-N,N-dimethyl-N-dodecyl ammonium bromide | 65 |
| N-[2-(2-formyl-4-methylphenoxy)-ethyl]-N,N-dimethyl-N-octadecyl ammonium bormide | 104 |
| N-[2-(2-formyl-6-methoxyphenoxy)-ethyl]-N,N-dimethyl-N-dodecyl ammonium bromide | 87–88 |
| N-[2-(2-formyl-6-methoxyphenoxy)-ethyl]-N,N-dimethyl-N-octadecyl ammonium bromide | 98–100 |
| N-[2-(3-formylphenoxy)-ethyl]-N,N-dimethyl-N-dodecyl ammonium bromide | 85–87 |
| N-[2-(4-formyl-6-methoxyphenoxy)-ethyl]-N,N-dimethyl-N-dodecyl ammonium bromide | 65 |
| N-[2-(4-formyl-6-methoxyphenoxy)-propyl]-N,N-dimethyl-N-octadecyl ammonium bromide | 88–90 |
| N-[2-(2-acetyl-4-chlorophenoxy)-ethyl]-N,N-dimethyl-N-dodecyl ammonium bromide | 94–96 |
| N-[2-(2-acetyl-4-methylphenoxy)-ethyl]-N,N-dimethyl-N-dodecyl ammonium bromide | 91–93 |
| N-[2-(2-acetyl-5-methoxy-phenoxy)-ethyl]-N,N-dimethyl-N-dodecyl ammonium bromide | 70–71 |
| N-[2-(4-acetylphenoxy)-ethyl]-N,N-dimethyl-N-dodecyl ammonium bromide | 76–78 |
| N-[2-(4-acetyl-6-methoxyphenoxy)-ethyl]-N,N-dimethyl-N-dodecyl ammonium bromide | 88–90 |
| N-[3-(2-acetylphenoxy)-propyl]-N,N-dimethyl-N-decyl ammonium bromide | 113–114 |
| N-[3-(2-acetylphenoxy)-propyl]-N,N-dimethyl-N-dodecyl ammonium bromide | 95–97 |
| N-[2-(2-propionylphenoxy)-ethyl]-N,N-dimethyl-N-dodecyl ammonium bromide | 103–104 |
| N-[2-(2-butyrylphenoxy)-ethyl]-N,N-dimethyl-N-dodecyl ammonium bromide | 109–110 |
| N-[2-(4-propionylphenoxy)-ethyl]-N,N-dimethyl-N-dodecyl ammonium bromide | 88–89 |
| N-[2-(4-butyrylphenoxy)-ethyl]-N,N-dimethyl-N-dodecyl ammonium bromide | 100–103 |
| N-[2-(2-formyl-3,5-dichlorophenoxy)-ethyl]-N,N-dimethyl-N-dodecyl ammonium chloride | 65–70 |

The strong spasmolytic activity of the compounds of Formula I is determined in standard animal tests, whereby the good specific musculotropic-spasmolytic activity is determined also.

The spasmolytic activity is determined in the isolated guinea pig ileum.

The high specificity of the musculotropic action of the compounds of Formula I is shown, e.g. in comparative tests on the isolated intestine of the guinea pig, from the ratio of the dosages having an equivalent lytic action to papaverine on the contraction caused by barium chloride and of the dosages having an equivalent lytic action to atropine on the contraction caused by acetylcholine, as well as in comparative tests on the living animal (anaesthetised guinea pigs) according to Brock et al., Arch. Exp. Path. und Pharmakol, 215, 512–524 (1952). In the latter test, the antagonistic action of the test substances to increases of pressure which occur on passing a flow of barium chloride or prostigmine solution through the abdominal cavity is determined. The substances to be tested are administered intravenously (*V. jugularis ext.*). As comparative antagonist to barium chloride, papaverine is again used and atropine is used as comparative antagonist to prostigmine. In these tests the following compounds show particularly good papaverine values as well as particularly good specificity:

(1) N-[2-(2-acetylphenoxy)-ethyl]-N,N-dimethyl-N-dodecyl ammonium bromide;
(2) N-[2-(2-butyrylphenoxy)-ethyl]-N,N-dimethyl-N-dodecyl ammonium bromide;
(3) N-[2-(2-acetyl-4-methyl-phenoxy)-ethyl]-N,N-dimethyl-N-dodecyl ammonium bromide; and
(4) N-[2-(2-propionylphenoxy)-ethyl]-N,N-dimethyl-N-dodecyl ammonium bromide.

In the mouse, dosages of as high as 1000–1200 mg./kg. S.C. of the compounds of Formula I, show no or only slight mydriatic effects. Such dosages are 50,000–60,000 times higher than a mydriatically effective atropine dosage.

In contrast to papaverine, compounds of the Formula I cause at most only slight retardation of the passage of digested foodstuffs through the intestines, as can be seen from the following test: In groups of mice, the substance to be tested in injected S.C. under the skin of the neck and, at the same time, a carbon slurry is given orally. After two hours, the mice are killed and it is determined in how many mice the carbon slurry has already passed the ileocecum and has entered the large intestine. The number obtained is expressed in percentage of the total number and this percentage is again converted into percentages of the percentage determined in the control animals—which is about 70%. On administration of 6 mg./kg. S.C. of above compound (1) the percentage, calculated on the control animals, is significantly higher than with papaverine (dosage 9 mg./kg. S.C.).

Of the numerous tests with the compounds of Formula I, attention is also drawn to the determination of the effect of blood pressure of compound (1) in the cat anaesthetised with Numal, using blood pressure recording and a cannula inserted into the carotid artery. In a dosage range of 0.1 to 10 mg./kg. I.V., compound (1) only has uncharacteristic and passing effects on the blood pressure depending on the dosage and it does not affect the pulse frequency.

The toxicity of the compounds of the invention is of favourable low order. Effects on the central nervous system are undeterminable or insignificant.

The musculotropic-spasmolytic active substances are administered to warm-blooded animals, particularly mammals, orally, rectally or parenterally, in particular intravenously, intramuscularly or subcutaneously. The daily dosages preferably lie between 0.2–2 mg./kg. bodyweight on parenteral administration and between 0.5–5 mg./kg. bodyweight on oral or rectal administration. Suitable dosage units such as ampoules, tablets, dragées, capsules or suppositories preferably contain 1/10 to 1/3 of a daily dosage of active substance. The spasmolytic active substances of Formula I can also be combined with other pharmaceuticals such as antiphlogistics, enterochemotherapeutics or analgesics, in the dosage units mentioned.

Dosage units for oral administration preferably contain between 5% and 90% of a quaternary ammonium salt of general Formula I as active substance. To produce tablets or dragée cores, the active substance is combined, e.g. with solid, pulverulent carriers such as lactose, saccharose, sorbitol, mannitol, maize starch, potato starch, amylopectin, talcum, laminaria powder or citrus pulp powder, optionally with the addition of lubricants and binders such as highly dispersed silicic acid, magnesium or calcium stearate, stearic acid, glycerine or polyethylene glycols or gelatin or cellulose derivatives such as ethyl cellulose and sodium salt of carboxymethyl cellulose. Dragée cores are then coated, e.g. with concentrated sugar solutions which can also contain, e.g. gum arabic, talcum and/or titanium dioxide, or with a lacquer dissolved in easily volatile organic solvents or mixtures of solvents, e.g. shellac. Dyestuffs can be added to these coatings, e.g. to distinguish between different dosages of active substance.

Other dosage units suitable for oral administration are hard capsules made of gelatin as well as soft, closed capsules made of gelatin and a softener such as glycerine. The hard capsules preferably contain the active substance in the form of a granulate in admixture with diluents such as lactose, saccharose or maize starch and/or lubricating agents such as talcum or magnesium stearate and, optionally, stabilisers such as sodium metabisulfite ($Na_2S_2O_5$) or ascorbic acid. In soft capsules, the active substance is preferably dissolved or suspended in suitable liquids such as liquid polyethylene glycols or oils, to which stabilisers can also be added.

Examples of dosage units for rectal administration are suppositories which consist of a combination of a quaternary ammonium salt of general Formula I with a suppository foundation mass, e.g. natural or synthetic triglycerides, or also gelatin rectal capsules which contain, e.g. a combination of the active substances with polyethylene glycols or oils.

Ampoules for parenteral, particularly intravenous, administration preferably contain a water soluble, quaternary ammonium salt of Formula I in a concentration of, preferably 0.5–5%, in aqueous solution, optionally together with suitable stabilisers and buffer substances.

The following examples will serve to further illustrate the production of dosage units for adminstration but should not be construed as a limitation on the scope of the invention.

EXAMPLE 1

To prepare 100,000 dragées each containing 25 mg. of N - [2 - (2 - acetylphenoxy) - ethyl] - N,N - dimethyl-N-dodecyl ammonium bromide as active substance, 2500 g. of the bromide are thoroughly mixed with 200 g. of highly dispersed silicic acid, 2150 g. of lactose and 150 g. of sodium salt of carboxymethyl cellulose and the mixture is evenly moistened with an ethanolic solution of 150 g. of ethyl cellulose and 50 g. of glycerine. The moist mixture is granulated through a suitable sieve (e.g. sieve III according to Ph. Helv. V). The granulate is then dried in a drying chamber for 8 hours at 40–50° or in a fluidized bed drier for about 40 minutes at 40°. The granulate is then granulated dry through a suitable sieve (e.g. sieve III–IIIa according to Ph. Helv. V). It is then mixed with 300 g. of dried maize starch, 350 g. of talcum, 50 g. of magnesium stearate and 100 g. of pulverised stearic acid. This mixture is pressed into 100,000 dragée cores.

The dragée cores are given a sugar coating in a rotating drum. To distinguish, the concentrated sugar solution used for the coating is coloured.

EXAMPLE 2

To produce 1,000 capsules each having 50 mg. content of active substance, 50 g. of N-[2-(2-acetylphenoxy)-ethyl]-N,N-dimethyl-N-dodecyl ammounium bromide are mixed with 223.0 g. of lactose. The mixture is evenly moistened with an aqueous solution of 2.0 g. of gelatin and granulated through a suitable sieve (e.g. sieve III according to Ph. Helv. V). The granulate is mixed with 10.0 g. of dried maize starch and 15 g. of talcum and equal amounts of the mixture are filled into 1,000 hard gelatin capsules size 1.

EXAMPLE 3

A suppository mass is made from 8.0 g. of N-[2-(2-acetylphenoxy)-ethyl]-N,N-dimethyl-N-dodecyl ammonium bromide and 160.0 g. of Adeps solidus and 100 suppositories are filled therewith. Each contains 80 mg. of active substance.

EXAMPLE 4

2.5 g. of N-[2-(2-acetylphenoxy)-ethyl]-N,N-dimethyl-N-dodecyl ammonium bromide and 2.2 g. of glycerin are dissolved in distilled water so that the volume is 100 ml., and the solution is filled into 100 1-ml. ampoules. Each contains 25 mg. of active substance.

What is claimed is:

1. A pharmaceutical composition comprising in dosage unit form an inert, pharmaceutically acceptable carrier and a spasmolytically active amount of a compound of the formula:

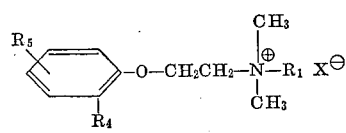

wherein
$R_1$ is alkyl of from 10 to 18 carbon atoms;
$R_4$ is lower alkanoyl;
$R_5$ is hydrogen, lower alkyl of from 1 to 4 carbon atoms, lower alkoxy of from 1 to 4 carbon atoms, chloro or fluoro; and
$X^\ominus$ is a monovalent anion of a pharmaceutically acceptable acid.

2. A pharmaceutical composition according to claim 1 wherein $R_1$ is dodecyl and $R_5$ is hydrogen or methyl.

3. A pharmaceutical composition according to claim 1 wherein the compound is N-[2-(2-acetylphenoxy)ethyl]-N,N-dimethyl-N-dodecyl ammonium bromide.

4. A pharmaceutical composition according to claim 1 wherein the compound is N-[2-(2-acetyl-4-methylphenoxy)ethyl]-N,N-dimethyl-N-dodecyl ammonium bromide.

5. A pharmaceutical composition according to claim 1 wherein the compound is N-[2-(2-propionylphenoxy)ethyl]-N,N-dimethyl-N-dodecyl ammonium bromide.

6. A pharmaceutical composition according to claim 1 wherein the compound is N-[2-(2-butyrylphenoxy)ethyl]-N,N-dimethyl-N-dodecyl ammonium bromide.

7. A method of treating cramps of the gastrointestinal tract, the biliary tract or the urogenital system of mammals which comprises administering to a mammal a spasmolytically active amount of a compound of the formula:

$$\underset{R_4}{\underset{|}{R_5\text{—}\bigcirc\text{—}}}\text{O—CH}_2\text{CH}_2\text{—}\overset{\overset{CH_3}{|}}{\underset{\underset{CH_3}{|}}{N^\oplus\text{—}R_1}}\ X^\ominus$$

wherein
$R_1$ is alkyl of from 10 to 18 carbon atoms;
$R^4$ is lower alkanoyl;
$R_5$ is hydrogen, lower alkyl of from 1 to 4 carbon atoms, lower alkoxy of from 1 to 4 carbon atoms, chloro or fluoro; and
$X^\ominus$ is a monovalent anion of a pharmaceutically acceptable acid.

8. The method according to claim 7 wherein the compound is N-[2-(2-acetylphenoxy)ethyl]-N,N-dimethyl-N-dodecyl ammonium bromide.

9. The method according to claim 7 wherein the compodnd is N-[2-(2-acetyl-4-methylphenoxy)ethyl]-N,N-dimethyl-N-dodecyl ammonium bromide.

10. The method according to claim 7 wherein the compound is N-[2-(2-propionylphenoxy)ethyl]-N,N-dimethyl-N-dodecyl ammonium bromide.

11. The method according to claim 7 wherein the compound is N-[2-(2-butyrylphenoxy)ethyl]-N,N-dimethyl-N-dodecyl ammonium bromide.

References Cited
UNITED STATES PATENTS 2,581,336    1/1952    Hartmann et al. __ 260—567.6 M

OTHER REFERENCES

Chem. Abst., 58, 5576H–5577 (1962).
Chem. Abst., 53, 10096b–10097 (1959).

STANLEY J. FRIEDMAN, Primary Examiner

U.S. Cl. X.R.

260—567.6